United States Patent
Jung et al.

(10) Patent No.: US 12,106,539 B2
(45) Date of Patent: Oct. 1, 2024

(54) METHOD AND APPARATUS WITH QUANTIZED IMAGE GENERATION

(71) Applicant: Samsung Electronics Co., Ltd., Suwon-si (KR)

(72) Inventors: Sangil Jung, Yongin-si (KR); Dongwook Lee, Suwon-si (KR); Jinwoo Son, Seoul (KR); Changyong Son, Anyang-si (KR); Jaehyoung Yoo, Seongnam-si (KR); Seohyung Lee, Seoul (KR); Changin Choi, Suwon-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 17/019,657

(22) Filed: Sep. 14, 2020

(65) Prior Publication Data

US 2021/0201447 A1    Jul. 1, 2021

(30) Foreign Application Priority Data

Dec. 26, 2019  (KR) ........................ 10-2019-0175530

(51) Int. Cl.
*G06V 10/28*      (2022.01)
*G06F 18/214*    (2023.01)
*G06F 18/24*      (2023.01)
*G06T 3/4046*    (2024.01)
*G06V 20/10*      (2022.01)

(52) U.S. Cl.
CPC ............ *G06V 10/28* (2022.01); *G06F 18/214* (2023.01); *G06F 18/24* (2023.01); *G06T 3/4046* (2013.01); *G06V 20/10* (2022.01)

(58) Field of Classification Search
CPC .... G06T 3/4046; G06V 20/10; G06K 9/6256; G06K 9/6267
USPC ........................................................ 382/157
See application file for complete search history.

(56) References Cited

U.S. PATENT DOCUMENTS

2012/0087587 A1 *  4/2012  Kacher ................ G06V 30/162
                                                                  382/182
2019/0050710 A1     2/2019  Wang et al.
2019/0347550 A1    11/2019  Jung et al.

FOREIGN PATENT DOCUMENTS

| CN | 105282392 A | 1/2016 |
| CN | 110019907 A | 7/2019 |
| CN | 110414630 A | 11/2019 |
| JP | 5642105 B2 | 12/2014 |
| KR | 10-2013-0125168 A | 11/2013 |
| KR | 10-2019-0051755 A | 5/2019 |

OTHER PUBLICATIONS

Xiong ("Degraded historical document image binarization using local features and support vector machine (SVM)", Optik 2017) (Year: 2017).*

(Continued)

*Primary Examiner* — Mark Roz
(74) *Attorney, Agent, or Firm* — NSIP Law

(57) ABSTRACT

A system includes: an image sensor configured to acquire an image; an image processor configured to generate a quantized image based on the acquired image using a trained quantization filter; and an output interface configured to output the quantized image.

26 Claims, 11 Drawing Sheets

(56) References Cited

OTHER PUBLICATIONS

Zhang ("Fast Document Image Binarization Based on an Improved Adaptive Otsu's Method and Destination Word Accumulation", JCIS 2011) (Year: 2011).*
Wikipedia ("Digitization", available from 2008) (Year: 2008).*
Huang ("An Introduction to Image Synthesis with Generative Adversarial Nets", arXiv 2018) (Year: 2018).*
Pastor-Pellicer ("Insights on the Use of Convolutional Neural Networks for Document Image Binarization" Springer 2015) (Year: 2015).*
Chang ("An Energy-Efficient FPGA-based Deconvolutional Neural Networks Accelerator for Single Image Super-Resolution" 2018) (Year: 2018).*
Majid ("A Novel Technique for Removal of High Density Impulse Noise from Digital Images", ICET 2010) (Year: 2010).*
Mandal, Candid: Robust Change Dynamics and Deterministic Update Policy for Dynamic Background Subtraction, IEEE 2018 (Year: 2018).*
From Wikipedia, the free encyclopedia "Dither" May 10, 2017 https://en.wikipedia.org/wiki/Dither (9 pages in English).
Cao, et al. "Deep visual-semantic quantization for efficient image retrieval." *Proceedings of the IEEE Conference on Computer Vision and Pattern Recognition.* 2017. (10 pages in English).
From Wikipedia, the free encyclopedia "Convolutional neural network" Jan. 10, 2020 https://en.wikipedia.org/w/index.php?title=Convolutional_neural_network&oldid=908472838 (28 pages in English).
Extended European Search Report issued on May 18, 2021 in counterpart European Patent Application No. 20209907.3 (10 pages in English).
Chines Office Action issued on Feb. 22, 2024, in counterpart Chinese Patent Application No. 202010939249.4 (17 pages in English, 10 pages in Chinese).
Holesovsky, Ondrej., "Compact ConvNets with Ternary Weights and Binary Activations", Degree Project in Computer Science and Engineering, Second Cycle, Stockholm, Sweden, 2017 (pp. 1-66).
Kim, Su-Jeong et al., "Decoding Hidden Data from Image Barcode via Deep Convolutional Neural Networks", *Journal of KIIT*, vol. 17, No. 5, May 31, 2019 (pp. 65-75).

* cited by examiner

METHOD AND APPARATUS WITH QUANTIZED IMAGE GENERATION

CROSS-REFERENCE TO RELATED APPLICATIONS

This application claims the benefit under 35 USC § 119(a) of Korean Patent Application No. 10-2019-0175530, filed on Dec. 26, 2019, in the Korean Intellectual Property Office, the entire disclosure of which is incorporated herein by reference for all purposes.

BACKGROUND

1. Field

The following description relates to a method and apparatus with quantized image generation.

2. Description of Related Art

A neural network may have an operation structure in which a large number of processing devices having simple functions are connected in parallel. To solve an issue of classifying an input pattern into a predetermined group, the neural network may be implemented with an algorithm with a learning ability. The neural network may have a generalization ability to generate a relatively correct output for an input pattern that has not been used for training, based on a result of the training.

However, the neural network may have a limitation of requiring a large amount of resources to process data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system includes: an image sensor configured to acquire an image; an image processor configured to generate a quantized image based on the acquired image using a trained quantization filter; and an output interface configured to output the quantized image.

The quantized image may be an image with a number of bits less than a number of bits of the image acquired by the image sensor.

The quantized image may be a binary image including pixels that each have one of a first pixel value and a second pixel value.

The quantization filter may be a dither matrix and include, as elements, a plurality of threshold values determined based on a training process.

The dither matrix may include: a plurality of channels, and, as the elements, different threshold values among the threshold values for each of the channels.

The training process may include: generating a quantized training image by quantizing a training image using the quantization filter; and determining the elements by adjusting the elements of the quantization filter based on a result label output from an object recognition model in response to the quantized training image being input to the object recognition model.

The adjusting of the elements may include adjusting the elements of the quantization filter to reduce a loss determined based on a difference between the result label and a correct answer label.

For the generating of the quantized image, the image processor may be configured to: perform a convolution operation on the acquired image using a trained convolution filter; and generate the quantized image by quantizing the image on which the convolution operation is performed using the quantization filter.

The image processor may include any one or any combination of a digital signal processor (DSP), an image signal processor (ISP), and a microcontroller unit (MCU).

The system may include an object recognition apparatus configured to recognize an object appearing in the quantized image using an object recognition model having a bit width corresponding to a bit width of the quantized image, and, for the outputting of the quantized image, the output interface may be configured to transfer the quantized image to the object recognition apparatus.

In another general aspect, a processor-implemented method includes: acquiring, using an image sensor, an image; generating, using an image processor, a quantized image based on the acquired image using a trained quantization filter; and outputting, using an output interface, the quantized image.

The quantized image may be an image with a number of bits less than a number of bits of the image acquired by the image sensor.

The quantization filter may be a dither matrix and may include, as elements, a plurality of threshold values determined based on a training process.

The dither matrix may include: a plurality of channels, and, as the elements, different threshold values among the threshold values for each of the channels.

The training process may include: generating a quantized training image by quantizing a training image using the quantization filter; acquiring a result label output from an object recognition model in response to the quantized training image being input to the object recognition model; and determining the elements by adjusting the elements of the quantization filter to reduce a loss determined based on a difference between the result label and a correct answer label.

The training process may include: acquiring a first result label output from the object recognition model in response to a training image being input to the object recognition model; acquiring a second result label output from the object recognition model in response to a quantized image generated by quantizing the training image using the quantization filter being input to the object recognition model; and determining the elements by adjusting the elements of the quantization filter to reduce a loss determined based on a difference between the first result label and the second result label.

The generating of the quantized image may include: performing a convolution operation on the acquired image using a trained convolution filter; and generating the quantized image by quantizing the image on which the convolution operation is performed using the quantization filter.

The outputting of the quantized image may include externally transmitting the quantized image to an object recognition apparatus, and the object recognition apparatus may be configured to recognize an object appearing in the quantized image using an object recognition model having a bit width corresponding to a bit width of the quantized image.

A non-transitory computer-readable storage medium may store instructions that, when executed by a processor, configure the processor to perform the method.

In another general aspect, a processor-implemented method includes: acquiring an image; generating, using an image processor, a quantized image by determining a pixel value of the quantized image to be either one of a first pixel value and a second pixel value based on a comparison of a pixel value of the acquired image and a corresponding threshold value of a trained quantization filter; and outputting, using an output interface, the quantized image.

The threshold value may be an intermediate value of a range of pixel values of the acquired image.

The determining of the pixel value of the quantized image may include: determining the pixel value of the quantized image to be the first pixel value in response to the pixel value of the acquired image being less than the corresponding threshold value; and determining the pixel value of the quantized image to be the second pixel value in response to the pixel value of the acquired image being greater than the corresponding threshold value.

The method may include adjusting one or more of pixel values of the acquired image that neighbor the pixel value of the acquired image, based on a determined error of the pixel value of the acquired image.

The method may include determining the error of the pixel value of the acquired image as a difference between the pixel value of the acquired image and a first reference value that is an intermediate value of a range from a minimum pixel value of the acquired image to the threshold value, in response to the pixel value of the acquired image being less than the threshold value.

The method may include determining the error of the pixel value of the acquired image as a difference between the pixel value of the acquired image and a second reference value that is an intermediate value of a range from the threshold value to a maximum pixel value of the acquired image, in response to the pixel value of the acquired image being greater than or equal to the threshold value.

The acquiring of the image may include either one of: acquiring the image from an image sensor; or acquiring the image by performing a convolution operation on an image acquired by the image sensor.

In another general aspect, a processor-implemented method includes: generating a quantized training image by quantizing a training image using a quantization filter; acquiring a result label output from an object recognition model in response to the quantized training image being input to the object recognition model; and training the quantization filter by adjusting elements of the quantization filter to reduce a loss determined based on a difference between the result label and a correct answer label.

The method may include acquiring, using an image sensor, an image; generating, using an image processor, a quantized image based on the acquired image using the trained quantization filter; and outputting, using an output interface, the quantized image.

Other features and aspects will be apparent from the following detailed description, the drawings, and the claims.

Figure 1:
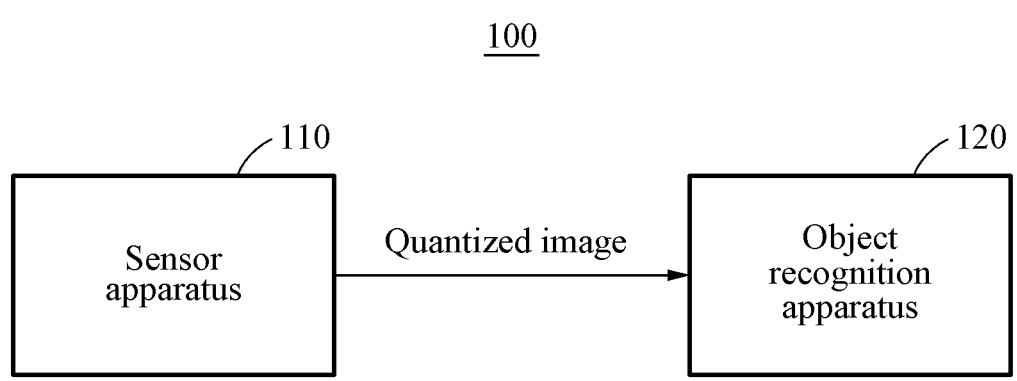
FIG. 1 illustrates an example of an object recognition system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions merely describe examples, and the scope of this disclosure or such examples are not limited to the descriptions provided in the present specification. Various alterations and modifications may be made to the examples. Here, the examples are not construed as limited to the disclosure and should be understood to include all changes, equivalents, and replacements within the idea and the technical scope of the disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein. The use of the term "may" herein with respect to an example or embodiment (for example, as to what an example or embodiment may include or implement) means that at least one example or embodiment exists where such a feature is included or implemented, while all examples are not limited thereto.

Hereinafter, examples will be described in detail with reference to the accompanying drawings, and like reference numerals in the drawings refer to like elements throughout.

FIG. 1 illustrates an example of an object recognition system 100.

Referring to FIG. 1, the object recognition system 100 may include a sensor apparatus 110 and an object recognition apparatus 120. The object recognition system 100 may be a system configured to acquire an image using the sensor apparatus 110 and to recognize an object appearing in the image using the object recognition apparatus 120. For example, the object recognition system 100 may be used for a face recognition or an object recognition, as non-limiting examples.

The sensor apparatus 110 may acquire an image using an image sensor (for example, a camera) and generate a quantized image by quantizing the acquired image. The quantized image may be an image with a number of bits less than a number of bits of the image acquired using the image sensor, and may include, for example, a binary image including pixels that each have one of a first pixel value (for example, "0") and a second pixel value (for example, "1").

The sensor apparatus 110 may automatically quantize an image using a processing unit (for example, an image processor or a microcontroller unit (MCU)) included in the sensor apparatus 110. The image processor may generate a quantized image by quantizing an image using a trained quantization filter. The quantized image may be transferred to the object recognition apparatus 120. As described above, the object recognition apparatus 120 may perform a processing of the quantized image acquired from the sensor apparatus 110, instead of performing a process of quantizing an image. A quantization processing may be performed in the sensor apparatus 110 and the quantized image may be transmitted from the sensor apparatus 110 to the object recognition apparatus 120, and thus the object recognition system 100 of one or more embodiments may improve the technical fields of image quantization, image recognition, and the functioning of computers by reducing both an amount of data and a bandwidth used for transmitting the image information from the sensor apparatus 110 to the object recognition apparatus 120, in comparison to when an acquired image that is not quantized is transmitted directly from a sensor apparatus to an object recognition apparatus. In the present disclosure, the image processor may be a processor configured to perform a function of processing an image in the sensor apparatus 110, and should not be interpreted as being limited to a processor configured to perform only a function of processing an image. Depending on examples, the image processor may perform functions (for example, controlling of the sensor apparatus 110) other than an image processing of the quantization processing.

In a typical process of quantizing an image, a large amount of information may be lost. Such information loss may have an influence on a result of an object recognition. The object recognition system 100 of one or more embodiments may improve the technical fields of image quantization, image recognition, and the functioning of computers by minimizing an amount of important information to be lost in an image quantization process using an optimal quantization filter trained through a training process, thus reducing an object recognition performance degradation due to use of a quantized image.

The object recognition apparatus 120 may receive the quantized image generated by the sensor apparatus 110 from the sensor apparatus 110 and perform an object recognition based on the quantized image. The object recognition apparatus 120 may perform the object recognition on the quantized image using a trained object recognition model. The object recognition model may be, for example, a neural network model, and may provide a score (for example, an expected value or a probability value) indicating a type of an object appearing in the quantized image based on image information (for example, pixel value information) of the quantized image input to the object recognition model.

The neural network model used as the object recognition model may include, for example, a deep neural network (DNN) (for example, a convolutional neural network (CNN) or a recurrent neural network (RNN)), however, the type of object recognition models is not limited thereto. Neural network models (for example, autoencoders or generative adversarial networks (GANs)) may also be used as object recognition models, and the type and forms of neural network models are not limited.

For example, the object recognition model may be a neural network model having a bit width corresponding to a bit width of the quantized image. By using a neural network model having a low bit width corresponding to the bit width of the quantized image, the object recognition model of one or more embodiments may improve the technical fields of image quantization, image recognition, and the functioning of computers by reducing an amount of resources and increasing a processing speed used to perform object recognition. In an example, the object recognition model of one or more embodiments may improve the technical fields of image quantization, image recognition, and the functioning of computers by using a low bit width so that the object recognition system 100 may perform an object recognition process with a low power, a low memory usage and at a high speed, in a limited embedded system (for example, a smart sensor or a smartphone).

Figure 2:
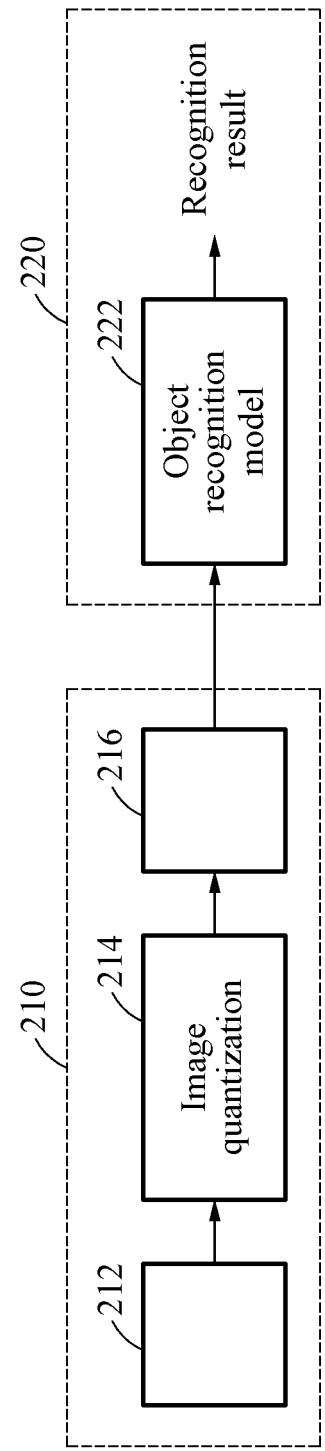
FIG. 2 illustrates an example of an object recognition process.

FIG. 2 illustrates an example of an object recognition process.

Referring to FIG. 2, the object recognition process may include operation 210 of generating a quantized image in a sensor apparatus (for example, the sensor apparatus 110 of FIG. 1), and operation 220 of performing an object recognition based on the quantized image in an object recognition apparatus (for example, the object recognition apparatus 120 of FIG. 1).

In operation 210, the sensor apparatus may acquire an image 212 using an image sensor and generate a quantized image 216 through an image quantization process 214. The image 212 acquired using the image sensor may have a pixel value represented by a number of bits (for example, 8 bits, 10 bits or 12 bits) and the quantized image 216 may have a pixel value represented by a smaller number of bits (for example, 2 bits or 4 bits).

In the image quantization process 214, the sensor apparatus may quantize the image 212 using a halftone scheme. The halftone scheme may be a scheme of converting an image with a high bit width into an image (for example, a binary image) with a low bit width, and may also be a scheme of representing a pixel value of an image as a density in a two-dimensional (2D) space. The sensor apparatus may quantize the image 212 using a trained quantization filter, or using an error diffusion scheme. A non-limiting example of using the error diffusion scheme will be further described below with reference to FIG. 8. In the following description, an example of quantizing the image 212 using the quantization filter is described.

The quantization filter used in the image quantization process 214 may be a dither matrix generated through the training process. The dither matrix may have different threshold values for each position as elements. Depending on examples, the dither matrix may include a plurality of channels. By using the dither matrix generated through the training process, the quantized image 216 optimized as an input of an object recognition model 222 used for an object recognition may be generated. Non-limiting examples of a training process of the dither matrix will be further described below with reference to FIGS. 5A and 5B.

The quantized image 216 may be transferred to the object recognition apparatus via an output interface of the sensor apparatus. As described above, the image 212 acquired using the image sensor may be converted into the quantized image 216 having a number of bits less than that of the image 212 in the sensor apparatus and the quantized image 216 may be transmitted to the object recognition apparatus, and thus a quantity of data transmitted may be reduced in comparison to when acquired image is transmitted directly to an object recognition apparatus.

In operation 220, the object recognition apparatus may perform the object recognition using the object recognition model 222. The object recognition model 222 may be, for example, a trained neural network model and may provide a recognition result of the object recognition based on the input quantized image 216. The object recognition process may be performed under a control of a processor (for example, a central processing unit (CPU), a graphics processing unit (GPU), or a neural network processing unit (NPU)) included in the object recognition apparatus. For example, when the quantized image 216 is input to the object recognition model 222, the object recognition model 222 may output a score indicating a possibility or a probability that an object appearing in the quantized image 216 corresponds to each class or label. In this example, the object recognition apparatus may determine an object recognition result based on information associated with the score.

When the quantized image 216 has a small number of bits, the quantized image 216 may be input to the object recognition model 222 having a low bit width. The low bit width represents, for example, a small number of bits (for example, 4 bits). A neural network model with a low bit width may be used as the object recognition model 222 for a high-speed operation in a limited resource environment (for example, a low-power and low-capacity memory). The quantized image 216 that is an image with a small number of bits may be used as an input to the object recognition model 222. The sensor apparatus may reduce a degree to which important information is lost in the image quantization process 214 using a trained quantization filter, and thus the sensor apparatus of one or more embodiments may increase an accuracy and a confidence of the object recognition result.

Figure 3:
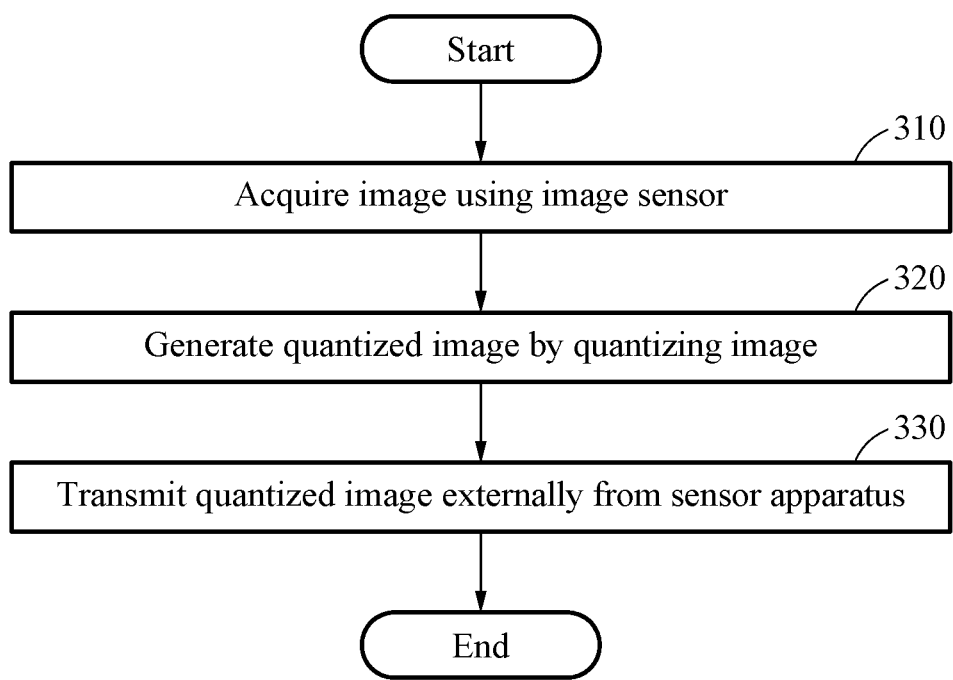
FIG. 3 illustrates an example of a quantized image generation method.

FIG. 3 illustrates an example of a quantized image generation method. The quantized image generation method of FIG. 3 may be performed by, for example, a sensor apparatus (for example, the sensor apparatus 110 of FIG. 1).

Referring to FIG. 3, in operation 310, the sensor apparatus may acquire an image using an image sensor (for example, a camera). The acquired image may have a large number of bits, and the sensor apparatus may automatically perform an image processing to reduce the number of bits of the image using a processing unit such as an image processor or an MCU included in the sensor apparatus. As the above image processing process, in operation 320, the sensor apparatus may generate a quantized image by quantizing the image acquired in operation 310 using a quantization filter that is trained. The quantized image may have a number of bits less than that of the image acquired using the image sensor, and may be, for example, a binary image.

The quantization filter may be, for example, a dither matrix, and the sensor apparatus may apply the dither matrix to the image acquired using the image sensor to generate the quantized image. The dither matrix may include a single channel or a plurality of channels, and a plurality of threshold values included as elements of the dither matrix may be determined through the training process. Through the training process, the elements of the dither matrix may be determined to minimize an object recognition performance degradation that may occur due to use of the quantized image.

For example, the sensor apparatus may perform a convolution operation prior to the quantization process. The sensor apparatus may perform a convolution operation on the image acquired using the image sensor, using a trained convolution filter. The sensor apparatus may generate a quantized image by quantizing the image on which the convolution operation is performed, using a trained quantization filter. A non-limiting example of a training process of the convolution filter and the quantization filter will be further described below with reference to FIG. 7.

In operation 330, the sensor apparatus may transmit the quantized image generated in operation 320 externally from the sensor apparatus via an output interface. As described above, the image acquired using the image sensor may be quantized in the sensor apparatus and the quantized image may be output from the sensor apparatus. The quantized image may be transmitted via a wire or wirelessly using the output interface. For example, the sensor apparatus may transfer the quantized image to the object recognition apparatus, and the object recognition apparatus may recognize an object appearing in the quantized image using an object recognition model having a bit width corresponding to a bit width of the quantized image.

Figure 4A:
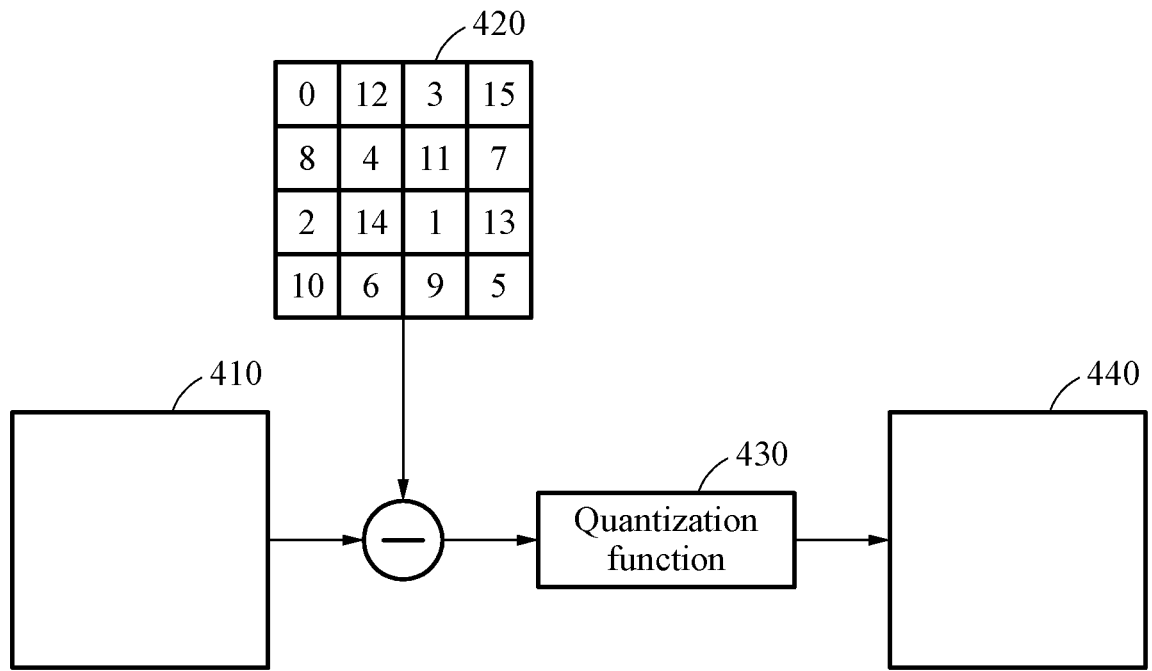
FIGS. 4A and 4B illustrate examples of a process of generating a quantized image using a quantization filter.
Figure 4B:
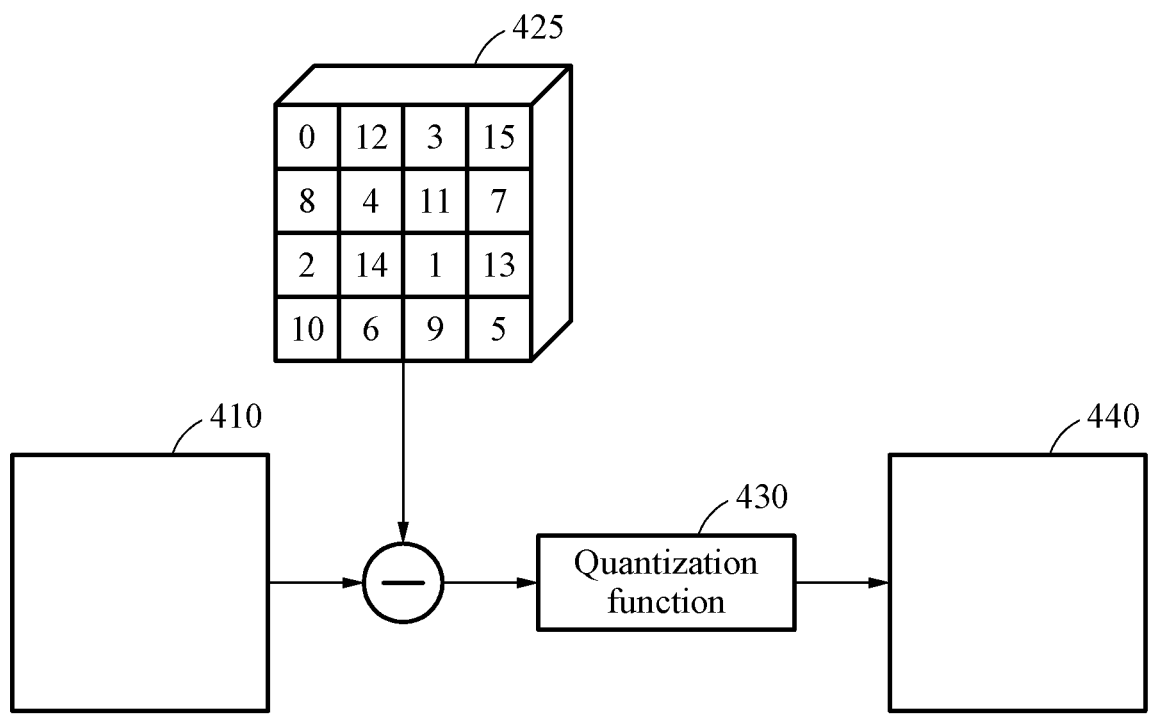

FIGS. 4A and 4B illustrate examples of a process of generating a quantized image using a quantization filter.

Referring to FIG. 4A, a sensor apparatus (for example, the sensor apparatus 110 of FIG. 1) may generate a quantized image 440 by quantizing an image 410 using a trained dither matrix 420 as a quantization filter. The dither matrix 420 may have different threshold values as elements and a size of the dither matrix 420 is not limited and may be variously set. As shown in FIG. 4B, a dither matrix 425 may include a plurality of channels. For example, the dither matrix 425 may include dither matrices for three channels, and may have different threshold values for each channel as elements.

Referring back to FIG. 4A, the sensor apparatus may apply the dither matrix 420 to pixel values of pixels included in the image 410 and apply a quantization function 430 to a result obtained by applying the dither matrix 420 to the pixel values, to generate the quantized image 440. For example, the sensor apparatus may subtract a threshold value included in the dither matrix 420 from pixel values of pixels to which the dither matrix 420 is to be applied among all pixels in the image 410. In an example, when a pixel value of a pixel A in the image 410 is "12" and a threshold value of the dither matrix 420 to be applied to the pixel A is "5", a value of "7" may be assigned to the pixel A as a result obtained by applying the dither matrix 420. In this example, in generating the quantized image 440, the sensor apparatus may apply the quantization function 430 to the value of "7" of the pixel A to replace the pixel value of the pixel A with a quantized value. For example, when a sign function is used as the quantization function 430, the pixel value of the pixel A may be replaced with a quantized value of "1" in response to the value of "7" of the pixel A being a positive value. In another example, when a value of "−2" is assigned to a pixel B as a result of the applying of the dither matrix 420, a pixel value of the pixel B may be replaced with a quantized value of "0" as a result of applying of the quantization function 430 when the value of "−2" of the pixel B is a negative value. Accordingly, in an example, a pixel of the quantized image 440 may have be generated to have a value of "1" when a corresponding pixel generated by applying the dither matrix 420 to a pixel of the image 410 has a positive value, and a pixel of the quantized image 440 may have be generated to have a value of "0" when a corresponding pixel generated by applying the dither matrix 420 to a pixel of the image 410 has a negative value. The sensor apparatus may perform the above process of each of the pixels in the image 410, to generate the quantized image 440 having pixels that each have quantized pixel values.

Figure 5A:
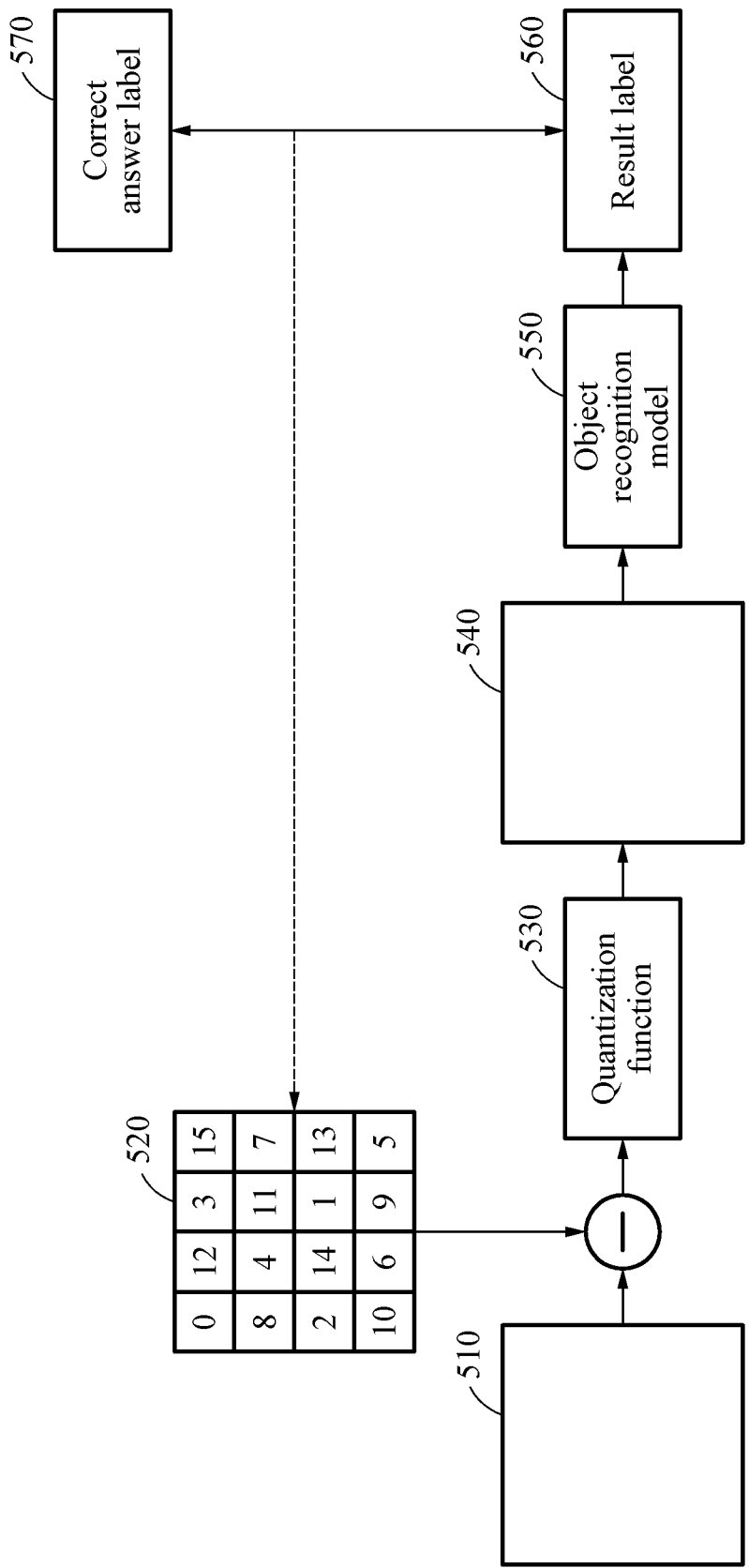
FIGS. 5A and 5B illustrate examples of a training process of a quantization filter.
Figure 5B:
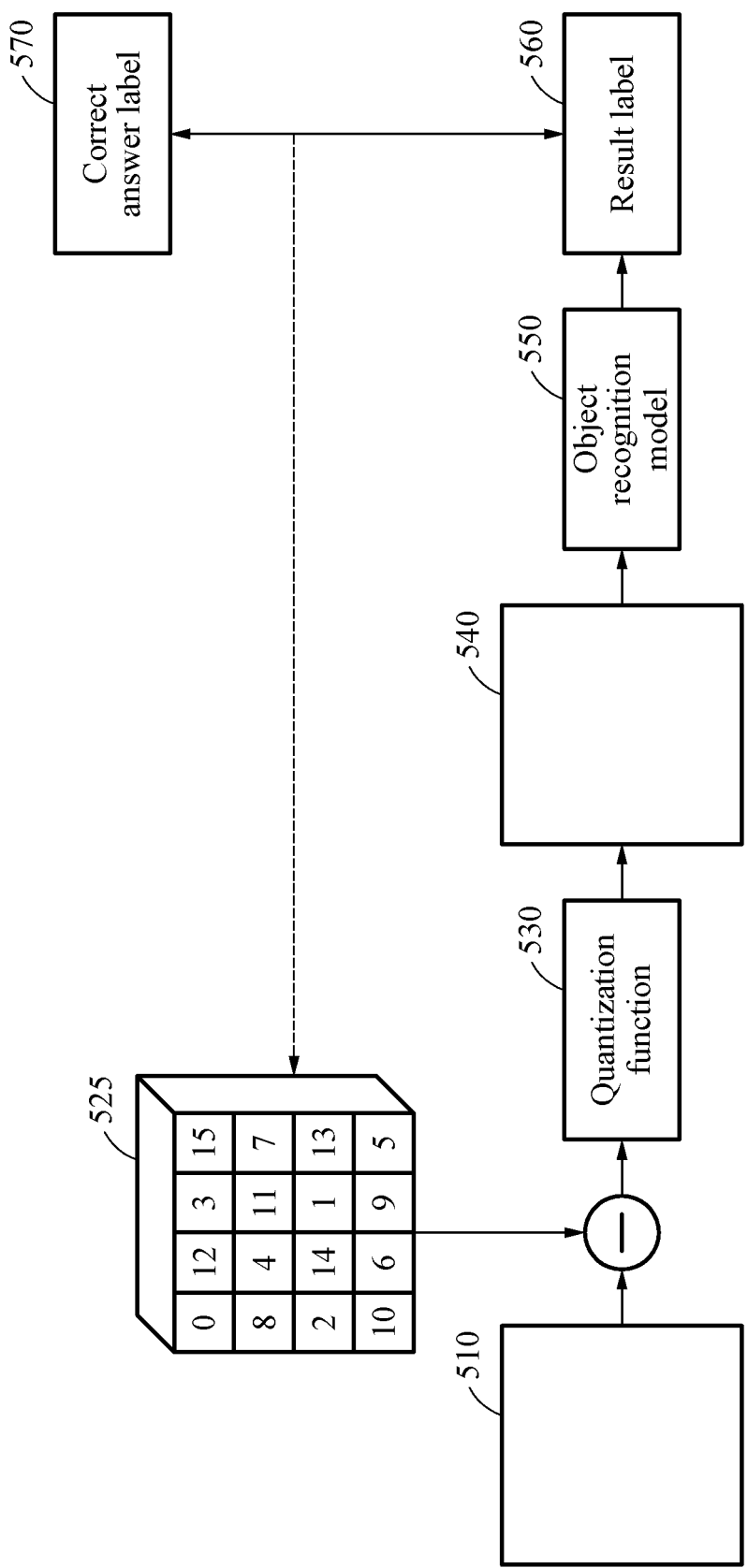

FIGS. 5A and 5B illustrate examples of a training process of a quantization filter.

Elements of a quantization filter used to generate a quantized image by a sensor apparatus (for example, the sensor apparatus 110 of FIG. 1) may be determined through the training process. In the following description, a dither matrix may be used as a quantization filter.

Referring to FIG. 5A, a training image 510 may be selected as training data, and a trainable quantization filter 520 may be applied to the training image 510. The training image 510 may be, for example, an image with a relatively large number of bits, for example, 8 bits. For example, a quantization function 530 may be applied to a result obtained by subtracting a threshold value included in the quantization filter 520 from a pixel value of each of pixels to which the quantization filter 520 is to be applied among all pixels in the training image 510. For example, a sign function may be used as the quantization function 530. The quantization function 530 may assign a quantized value to a pixel value of a corresponding pixel based on the result obtained by subtracting the threshold value, and a training image 540 quantized based on a result of applying the quantization function 530 may be generated. As described above, the quantized training image 540 (for example, a 1-bit binary image) may be generated by quantizing the training image 510 using the quantization filter 520.

The quantized training image 540 may be input to an object recognition model 550. In response to an input of the quantized training image 540 to the object recognition model 550, a result label 560 output from the object recognition model 550 may be obtained. The object recognition model 550 may be based on a neural network model, and may provide score information about a type of an object appearing in the quantized training image 540 based on a calculation result of the neural network model. A loss may be calculated based on a difference between the result label 560 and a correct answer label 570 of a real or predetermined object appearing in the training image 510, and elements (for example, threshold values of a dither matrix) of the quantization filter 520 may be adjusted to reduce the loss based on a backpropagation algorithm. The correct answer label 570 may correspond to a desired value corresponding to the training image 510.

As described above, the quantization filter 520 may be trained to minimize an object recognition performance degradation due to use of a quantized image of the object recognition model 550. Depending on examples, the object recognition model 550 may be trained as well as the quantization filter 520 in the training process, and accordingly parameters of the object recognition model 550 may also be adjusted.

The above training process may be repeatedly performed for each of various training images, and elements of the quantization filter 520 may be iteratively updated to desired values through a large number of training processes. For example, elements of the quantization filter 520 may be iteratively updated using the training process until the calculated loss is less than or equal to a predetermined threshold.

In another example, when the object recognition model 550 is trained based on the training image 510 and when parameters of the object recognition model 550 are fixed, the training process of the quantization filter 520 may be performed. In the training process of the quantization filter 520, when the training image 510 is input to the object recognition model 550, a first result label 560 output from the object recognition model 550 may be obtained. When the quantized training image 540 generated by quantizing the training image 510 using the quantization filter 520 and the quantization function 530 is input to the object recognition model 550, a second result label 560 output from the object recognition model 550 may be obtained. A loss may be calculated based on a difference between the first result label 560 and the second result label 560, and elements of the quantization filter 520 may be adjusted to reduce the loss based on the backpropagation algorithm to train the quantization filter 520. In this example, the first result label 560 and the second result label 560 may be in forms of, for example, embedding vectors. The trained quantization filter 520 may correspond to the dither matrix 420 of FIG. 4A, in an example.

FIG. 5B illustrates an example in which a quantization filter 525 may be a dither matrix including a plurality of channels. The training process described above with reference to FIG. 5A is equally applicable to a process of training the quantization filter 525, except that threshold values of a dither matrix for each channel may be adjusted in the quantization filter 525 forming a plurality of channels, instead of or in addition to the quantization filter 520 for a single channel, to train the quantization filter 525. The trained quantization filter 525 may correspond to the dither matrix 425 of FIG. 4B, in an example.

Figure 6:
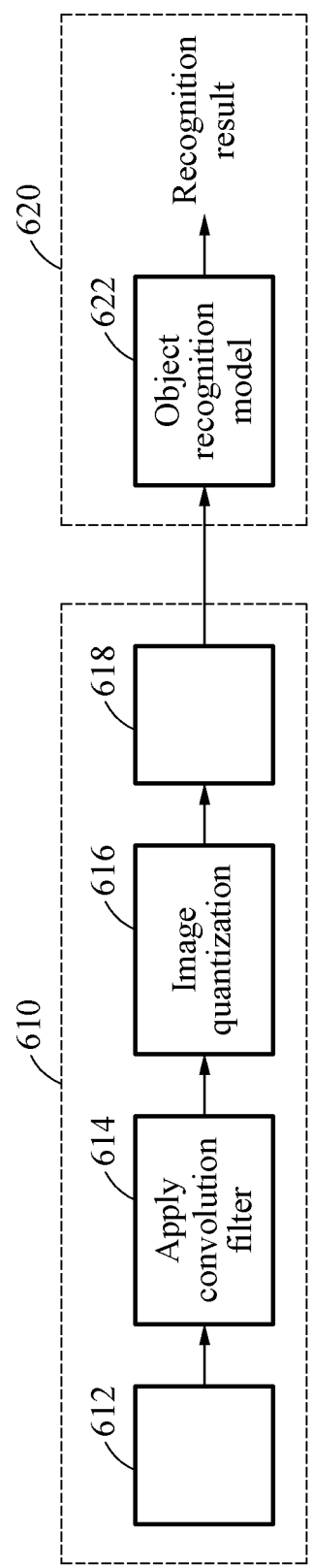
FIG. 6 illustrates anr example of an object recognition process.

FIG. 6 illustrates an example of an object recognition process.

Referring to FIG. 6, the object recognition process includes operation 610 of generating a quantized image in a sensor apparatus (for example, the sensor apparatus 110 of FIG. 1), and operation 620 of performing an object recognition based on the quantized image in an object recognition apparatus (for example, the object recognition apparatus 120 of FIG. 1).

In operation 610, the sensor apparatus may acquire an image 612 using an image sensor and perform a convolution operation by applying a convolution filter to the acquired image 612 in operation 614. The convolution filter may be a trained convolution filter, and the trained convolution filter may be determined through a training process. The sensor apparatus may perform an image quantization 616 on an image 612 to which the convolution filter is applied, and generate a quantized image 618. The sensor apparatus may perform the image quantization 616 using a trained quantization filter. By performing a convolution operation on the image 612 before performing the image quantization 616, the image 612 may be adjusted to more accurately represent an image feature associated with an object.

The quantized image 618 may be transferred to the object recognition apparatus. In operation 620, the object recognition apparatus may perform the object recognition based on the quantized image 618. The object recognition apparatus may input the quantized image 618 to the object recognition model 622, and the object recognition model 622 may provide a recognition result of the object recognition based on the quantized image 618. For example, the object recognition model 622 may provide information associated with a result label corresponding to the quantized image 618.

Figure 7:
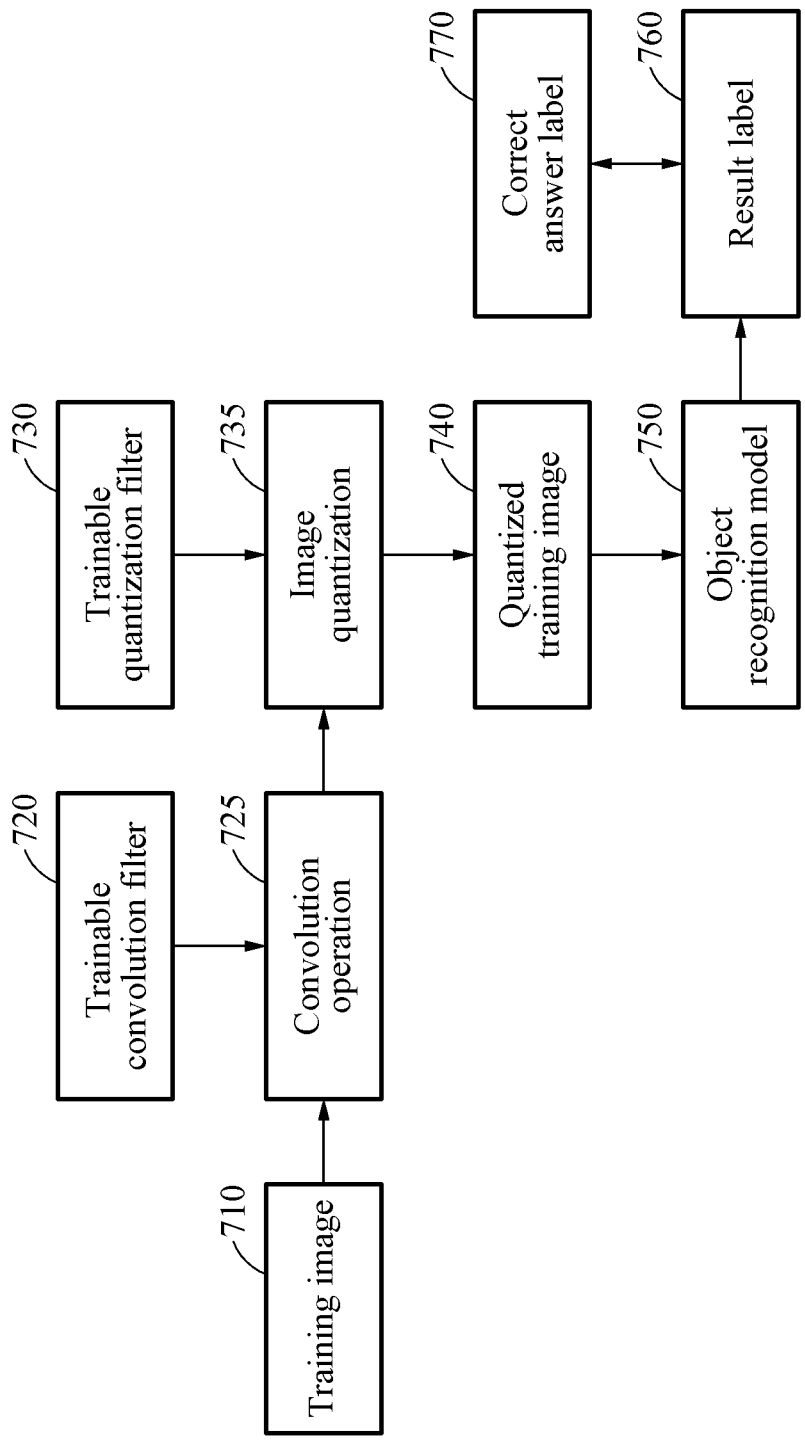
FIG. 7 illustrates an example of a training process of a convolution filter and a quantization filter.

FIG. 7 illustrates an example of a training process of a convolution filter and a quantization filter.

Referring to FIG. 7, a training image 710 may be provided as training data. The training image 710 is, for example, an image with a relatively large number of bits (for example, 8 bits). A convolution operation 725 may be performed on the training image 710 based on a trainable convolution filter 720, and an image quantization 735 may be performed on the training image on which the convolution operation 725 is performed, based on a trainable quantization filter 730. A quantized training image 740 may be generated as a result obtained by performing the image quantization 735, and the generated quantized training image 740 may be input to an object recognition model 750. The object recognition model 750 may output a result label 760 corresponding to the quantized training image 740, and a loss may be determined based on a difference between the result label 760 and a correct answer label 770 corresponding to the original training image 710. Elements or parameters of the convolution filter 720 and the quantization filter 730 may be adjusted to minimize the loss based on, for example, a backpropagation algorithm to train the convolution filter 720 and the quantization filter 730. The above training process may be repeatedly performed for each of training images, and the convolution filter 720 and the quantization filter 730 may be iteratively desirably changed through a large number of training processes. For example, the elements or the parameters of the convolution filter 720 and the quantization filter 730 may be iteratively updated using the training process until the determined loss is less than or equal to a predetermined threshold. The trained quantization filter 730 may correspond to either of the dither matrix 420 of FIG. 4A and the dither matrix 425 of FIG. 4B, in an example.

Figure 8:
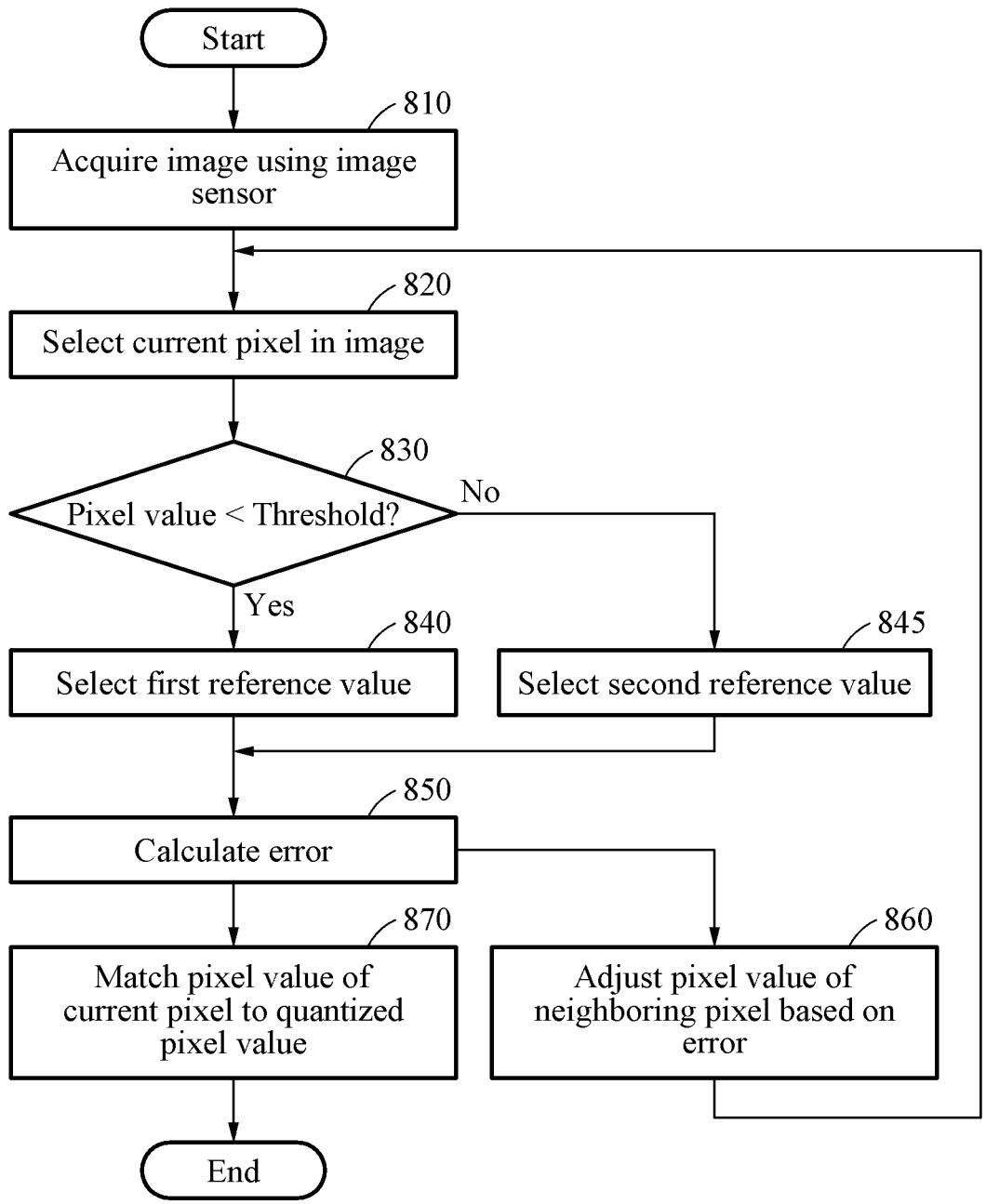
FIG. 8 illustrates an example of a quantized image generation method.

FIG. 8 illustrates an example of a quantized image generation method (for example, using an error diffusion scheme). The error diffusion scheme may be a scheme of propagating a quantization error caused by a quantization to neighboring pixels and compensating for the quantization error. For example, when an image is quantized using the error diffusion scheme, a sensor apparatus (for example, the sensor apparatus 110 of FIG. 1) may reduce a range of quantization errors using an intermediate value of each quantization interval as a reference value of a quantization interval.

Referring to FIG. 8, in operation 810, the sensor apparatus may acquire an image using an image sensor. In operation 820, the sensor apparatus may select a current pixel from the acquired image. For example, the current pixel may be selected in a raster scan order.

In operation 830, whether a pixel value of the selected current pixel is greater than a threshold value is determined. For example, when a pixel value of a pixel in the image is in a range of "0" to "255", the threshold value may be an intermediate value of the range, that is, "127.5". For example, when the image sensor is configured to generate the image to have pixel values in a range from a minimum pixel value (for example, "0") and a maximum pixel value (for example, "255"), the sensor apparatus may determine the threshold value to be an average of the minimum and maximum pixel value (for example, "127.5"). However, the threshold value is not limited thereto.

When the pixel value of the current pixel is less than the threshold value, a first reference value may be selected as a reference value used to calculate a quantization error in operation 840. When the pixel value of the current pixel is not less than the threshold value, a second reference value is selected as a reference value used to calculate a quantization error in operation 845. For example, the first reference value may correspond to "63.75" that is an intermediate value of a first quantization interval of "0" to "127.5", and the second reference value may correspond to "191.25" that is an intermediate value of a second quantization interval of "127.5" to "255". For example, when the image sensor is configured to generate the image to have pixel values in a range from a minimum pixel value (for example, "0") and a maximum pixel value (for example, "255") and the threshold value is determined to be an average of the minimum and maximum pixel value (for example, "127.5"), the sensor apparatus may determine the first reference value to be an average of the minimum pixel value and the threshold value (for example, "63.75") and may determine the second reference value to be an average of the threshold value and the maximum pixel value (for example, "191.25").

In operation 850, the sensor apparatus may calculate an error corresponding to the current pixel based on the pixel value of the current pixel and a quantization interval including the pixel value of the current pixel. In an example, when the pixel value of the current pixel is "100", the first reference value of "63.75" may be selected in operation 840 in response to the pixel value of the current pixel being less than "127.5" that is the threshold value. In this example, in operation 850, "36.25" obtained by subtracting the first reference value of "63.75" from the pixel value of "100" may be calculated as an error. In another example, when the pixel value of the current pixel is "140", the second reference value of "191.25" may be selected in operation 845 in response to the pixel value of the current pixel is greater than "127.5" that is the threshold value. In this example, in operation 850, "−51.25" obtained by subtracting the second reference value of "191.25" from the pixel value of "140" may be calculated as an error.

In operation 860, the sensor apparatus may adjust a pixel value of a neighboring pixel of the current pixel based on the error corresponding to the current pixel calculated in operation 850. For example, the sensor apparatus may add a value obtained by applying a predetermined weight to the error to the pixel value of the neighboring pixel. The neighboring pixel may correspond to at least one pixel on which a quantization processing is not yet performed among pixels adjacent to the current pixel, and different weights may be applied to neighboring bipolar pixels. For example, the sensor apparatus may apply the error to a neighboring pixel based on a Floyd-Steinberg algorithm. In this example, the neighboring pixel may include a pixel located to each of the right, bottom-left, bottom, and bottom-right of the current pixel. As described above, the error corresponding to the current pixel may be propagated to neighboring pixels, pixel values of the neighboring pixels may be adjusted, and an image quantization may be performed based on the adjusted pixel values.

In operation 870, the sensor apparatus may generate a quantized image by matching the pixel value of the current pixel to a quantized pixel value. In an example, when the pixel value of the current pixel is included in a first quantization interval (for example, an interval from the minimum pixel value to the threshold value), the sensor apparatus may match the pixel value of the current pixel to a first quantized pixel value, for example, "0". In another example, when the pixel value of the current pixel is included in a second quantization interval (for example, an interval from the threshold value to the maximum pixel value), the sensor apparatus may match the pixel value of the current pixel to a second quantized pixel value, for example, "1". Depending on examples, a quantization of an image may be performed by a binary quantization, a bipolar quantization, or a ternary quantization, however, examples are not limited thereto. In an example of the ternary quantization, a pixel value of an image may be mapped to any one or any combination of "−1", "0", and "1" and the image may be quantized. Also, three quantization intervals may exist. A reference value of each of the three quantization intervals may be set as an intermediate value of each of the three quantization intervals.

As described above, an intermediate value of a quantization interval may be set as a reference value, to minimize a quantization error. For example, when the first reference value is "0" and when the second reference value is "255", the quantization error may have a range of "−127" to "127". When the first reference value and the second reference value are set to "63.75" and "191.25", respectively, as described above, the quantization error may have a range of "−63.75" to "63.75". Thus, the range of the quantization error may be minimized to reduce an error between the quantized image and the original image.

An intermediate value of a quantization interval may be used as a reference value of the quantization interval as described above, or all values other than a minimum value, for example, "0" and a maximum value, for example, "255", may be used as a reference value of the quantization interval. Depending on examples, the reference value of the quantization interval may also be determined through a training process.

Figure 9:
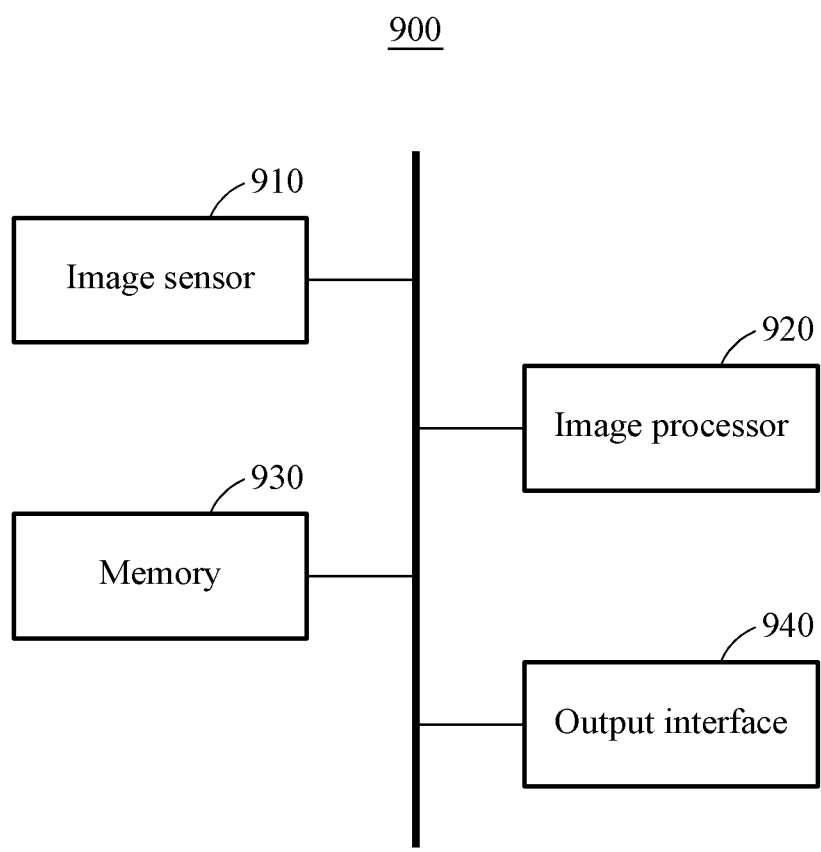
FIG. 9 illustrates an example of a sensor apparatus.

FIG. 9 illustrates an example of a sensor apparatus (for example, a sensor apparatus 900).

Referring to FIG. 9, the sensor apparatus 900 may include an image sensor 910, an image processor 920 (for example, one or more processors), a memory 930, and an output interface 940. The sensor apparatus 900 may correspond to a sensor apparatus described in the present disclosure (for example, the sensor apparatus 110 of FIG. 1).

The image sensor 910 may acquire an image. For example, the image sensor 910 may acquire an image (for example, a color image, a grayscale image, or an infrared image).

The image processor 920 may control an operation of the sensor apparatus 900, and may include, for example, any one or any combination of a digital signal processor (DSP), an image signal processor (ISP), and an MCU. The image processor 920 may generate a quantized image by performing an image quantization processing on the image acquired by the image sensor 910. The image processor 920 may perform one or more or all operations associated with the image quantization described above with reference to FIGS. 1 through 8.

In an example, the image processor 920 may generate a quantized image (for example, a binary image) by quantizing an image acquired using a trained quantization filter (for example, a dither matrix). In another example, the image processor 920 may generate a quantized image by performing a convolution operation on the image acquired by the image sensor 910 using a trained convolution filter and by quantizing the image on which the convolution operation is performed using a trained quantization filter. In still another example, the image processor 920 may generate a quantized image using the error diffusion scheme described above with reference to FIG. 8. The image processor 920 may calculate an error corresponding to a current pixel included in the image, based on a pixel value of the current pixel and a quantization interval including the pixel value, may adjust a pixel value of a neighboring pixel of the current pixel based on the calculated error, and may generate the quantized image based on an adjustment result.

The memory 930 may store instructions to be executed by the processor 920, and information used to perform an image quantization. The memory 930 may store information associated with the image acquired by the image sensor 910 and a quantized image generated through an image quantization processing. The memory 930 may include, for example, a high-speed random access memory (RAM) and/or a non-volatile computer-readable storage medium.

The output interface 940 may transmit the quantized image generated by the image processor 920 externally from the sensor apparatus 900. For example, the output interface 940 may transmit the quantized image to an object recognition apparatus (for example, the object recognition apparatus 120 of FIG. 1 or the object recognition apparatus 1020 of FIG. 10 discussed below) via a wired or wireless communication.

Figure 10:
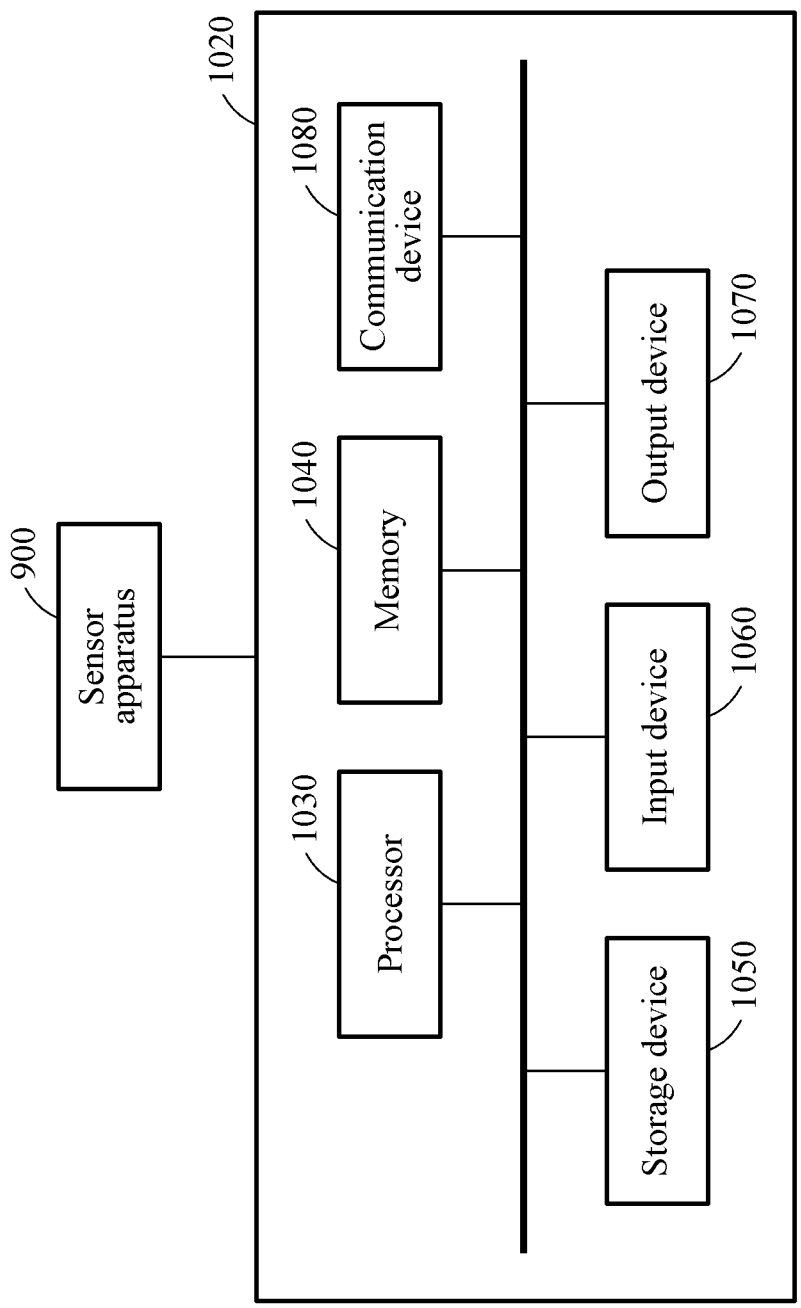
FIG. 10 illustrates an example of an apparatus comprising a sensor apparatus and an object recognition apparatus.

FIG. 10 illustrates an example of an apparatus or system including a sensor apparatus (for example, the sensor apparatus 900) and an object recognition apparatus (for example, an object recognition apparatus 1020).

Referring to FIG. 10, the object recognition apparatus 1020 may include a processor 1030 (for example, one or more processors), a memory 1040, a storage device 1050, an input device 1060, an output device 1070, and a communication device 1080. Components of the object recognition apparatus 1020 may communicate with each other via a communication bus. The object recognition apparatus 1020 may correspond to the object recognition apparatus described in the present disclosure (for example, the object recognition apparatus 120 of FIG. 1).

The processor 1030 may control an operation of the object recognition apparatus 1020 and execute functions and instructions to perform an object recognition. For example, the processor 1030 may execute instructions stored in the memory 1040 or the storage device 1050. The processor 1030 may include, for example, any one or any combination of a CPU, a GPU, and an NPU, and may perform one or more or all operations associated with the object recognition described above with reference to FIGS. 1 through 9. For example, the processor 1030 may perform the object recognition based on the quantized image received from the sensor apparatus 900.

The memory 1040 may store instructions to be executed by the processor 1030 and information used to perform the object recognition. The memory 1040 may include, for example, a high-speed RAM and/or a non-volatile computer-readable storage medium.

The storage device 1050 may include a non-transitory computer-readable storage medium. The storage device 1050 may store a larger amount of information than that of the memory 1040 for a relatively long period of time. For example, the storage device 1050 may include a hard disk, an optical disk, or a solid state drive (SSD). Information about an object recognition model used for an object recognition may be stored in the memory 1040 and/or the storage device 1050.

The input device 1060 may receive an input from a user through a tactile input, a video input, an audio input, and/or a touch input. For example, the input device 1060 may detect an input from a keyboard, a mouse, a touchscreen, a microphone, and/or the user, and may include any other device configured to transfer the detected input to the object recognition apparatus 1020.

The output device 1070 may provide a user with an output of the object recognition apparatus 1020 through a visual channel, an auditory channel, and/or a tactile channel. The output device 1070 may include, for example, a display, a touchscreen, a speaker, a vibration generator, or other devices configured to provide the user with the output.

The communication device 1080 may communicate with an external device via a wired or wireless network. For example, the communication device 1080 may receive the quantized image from the sensor apparatus 900 via a mobile industry processor interface (MIPI).

The object recognition systems, sensor apparatuses, object recognition apparatuses, image sensors, image processors, memories, output interfaces, processors, storage devices, input devices, output devices, communication devices, object recognition system 100, sensor apparatus 110, object recognition apparatus 120, sensor apparatus 900, image sensor 910, image processor 920, memory 930, output interface 940, object recognition apparatus 1020, processor 1030, memory 1040, storage device 1050, input device 1060, output device 1070, communication device 1080, apparatuses, units, modules, devices, and other components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A system, comprising:
   an image sensor configured to acquire an image;
   an image processor configured to generate a quantized image by selecting one of a plurality of preset reference values based on whether a pixel value of the acquired image is less than a threshold value of a trained quantization filter, determining a difference between the pixel value of the acquired image and the selected reference value, and adjusting one or more of pixel values of the acquired image based on the difference; and
   an output interface configured to output the quantized image,
   wherein the preset reference values are determined based on the threshold value and a range of pixel values of the acquired image.

2. The system of claim 1, wherein the quantized image is an image with a number of bits less than a number of bits of the image acquired by the image sensor.

3. The system of claim 1, wherein the quantized image is a binary image including pixels that each have one of a first pixel value and a second pixel value.

4. The system of claim 1, wherein the quantization filter is a dither matrix and comprises, as elements, a plurality of threshold values comprising the threshold value and determined based on a training process.

5. The system of claim 4, wherein the dither matrix comprises:
   a plurality of channels, and
   as the elements, different threshold values among the threshold values for each of the channels.

6. The system of claim 4, wherein the training process comprises:
   generating a quantized training image by quantizing a training image using the quantization filter; and
   determining the elements by adjusting the elements of the quantization filter based on a result label output from an object recognition model in response to the quantized training image being input to the object recognition model.

7. The system of claim 6, wherein the adjusting of the elements comprises adjusting the elements of the quantization filter to reduce a loss determined based on a difference between the result label and a correct answer label.

8. The system of claim 1, wherein, for the generating of the quantized image, the image processor is configured to:
   perform a convolution operation on the acquired image using a trained convolution filter; and
   generate the quantized image by quantizing the image on which the convolution operation is performed using the quantization filter.

9. The system of claim 1, wherein the image processor comprises any one or any combination of a digital signal processor (DSP), an image signal processor (ISP), and a microcontroller unit (MCU).

10. The system of claim 1, further comprising:
    an object recognition apparatus configured to recognize an object appearing in the quantized image using an object recognition model having a bit width corresponding to a bit width of the quantized image, and
    for the outputting of the quantized image, the output interface is configured to transfer the quantized image to the object recognition apparatus.

11. A processor-implemented method comprising:
acquiring, using an image sensor, an image;
generating, using an image processor, a quantized image by selecting one of a plurality of preset reference values based on whether a pixel value of the acquired image is less than a threshold value of a trained quantization filter, determining a difference between the pixel value of the acquired image and the selected reference value, and adjusting one or more of pixel values of the acquired image based on the difference; and
outputting, using an output interface, the quantized image, wherein the preset reference values are determined based on the threshold value and a range of pixel values of the acquired image.

12. The method of claim 11, wherein the quantized image is an image with a number of bits less than a number of bits of the image acquired by the image sensor.

13. The method of claim 11, wherein the quantization filter is a dither matrix and comprises, as elements, a plurality of threshold values comprising the threshold value and determined based on a training process.

14. The apparatus of claim 13, wherein the dither matrix comprises:
a plurality of channels, and
as the elements, different threshold values among the threshold values for each of the channels.

15. The method of claim 13, wherein the training process comprises:
generating a quantized training image by quantizing a training image using the quantization filter;
acquiring a result label output from an object recognition model in response to the quantized training image being input to the object recognition model; and
determining the elements by adjusting the elements of the quantization filter to reduce a loss determined based on a difference between the result label and a correct answer label.

16. The method of claim 13, wherein the training process comprises:
acquiring a first result label output from the object recognition model in response to a training image being input to the object recognition model;
acquiring a second result label output from the object recognition model in response to a quantized image generated by quantizing the training image using the quantization filter being input to the object recognition model; and
determining the elements by adjusting the elements of the quantization filter to reduce a loss determined based on a difference between the first result label and the second result label.

17. The method of claim 11, wherein the generating of the quantized image comprises:
performing a convolution operation on the acquired image using a trained convolution filter; and
generating the quantized image by quantizing the image on which the convolution operation is performed using the quantization filter.

18. The method of claim 11, wherein
the outputting of the quantized image comprises externally transmitting the quantized image to an object recognition apparatus, and
the object recognition apparatus is configured to recognize an object appearing in the quantized image using an object recognition model having a bit width corresponding to a bit width of the quantized image.

19. A non-transitory computer-readable storage medium storing instructions that, when executed by a processor, configure the processor to perform the method of claim 11.

20. A processor-implemented method comprising:
acquiring an image;
generating, using an image processor, a quantized image by selecting one of a plurality of preset reference values based on whether a pixel value of the acquired image is less than a threshold value of a trained quantization filter, determining a pixel value of the quantized image to be either one of a first pixel value and a second pixel value based on a difference between the pixel value of the acquired image and the selected reference value, and adjusting one or more of pixel values of the acquired image based on the difference; and
outputting, using an output interface, the quantized image, wherein the preset reference values are determined based on the threshold value and a range of pixel values of the acquired image.

21. The method of claim 20, wherein the threshold value is an intermediate value of the range of pixel values of the acquired image.

22. The method of claim 20, wherein the determining of the pixel value of the quantized image comprises:
determining the pixel value of the quantized image to be the first pixel value in response to the pixel value of the acquired image being less than the corresponding threshold value; and
determining the pixel value of the quantized image to be the second pixel value in response to the pixel value of the acquired image being greater than the corresponding threshold value.

23. The method of claim 20, further comprising adjusting one or more of pixel values of the acquired image that neighbor the pixel value of the acquired image, based on a determined error of the pixel value of the acquired image.

24. The method of claim 23, further comprising determining the error of the pixel value of the acquired image as a difference between the pixel value of the acquired image and a first reference value, being the reference value, that is an intermediate value of a range from a minimum pixel value of the acquired image to the threshold value, in response to the pixel value of the acquired image being less than the threshold value.

25. The method of claim 23, further comprising determining the error of the pixel value of the acquired image as a difference between the pixel value of the acquired image and a second reference value, being the reference value, that is an intermediate value of a range from the threshold value to a maximum pixel value of the acquired image, in response to the pixel value of the acquired image being greater than or equal to the threshold value.

26. The method of claim 20, wherein the acquiring of the image comprises either one of:
acquiring the image from an image sensor; or
acquiring the image by performing a convolution operation on an image acquired by the image sensor.

* * * * *